United States Patent Office 3,448,845
Patented June 10, 1969

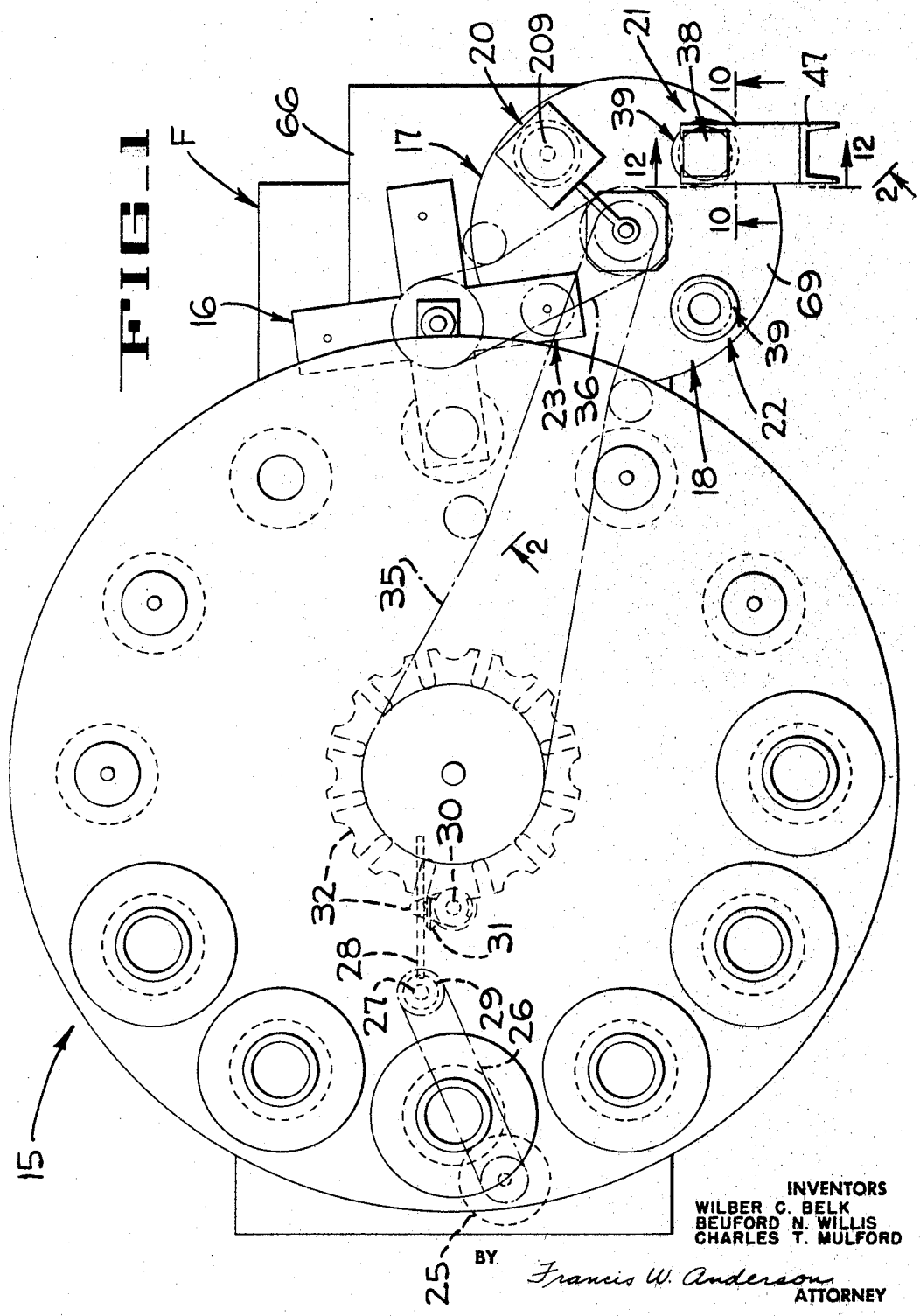

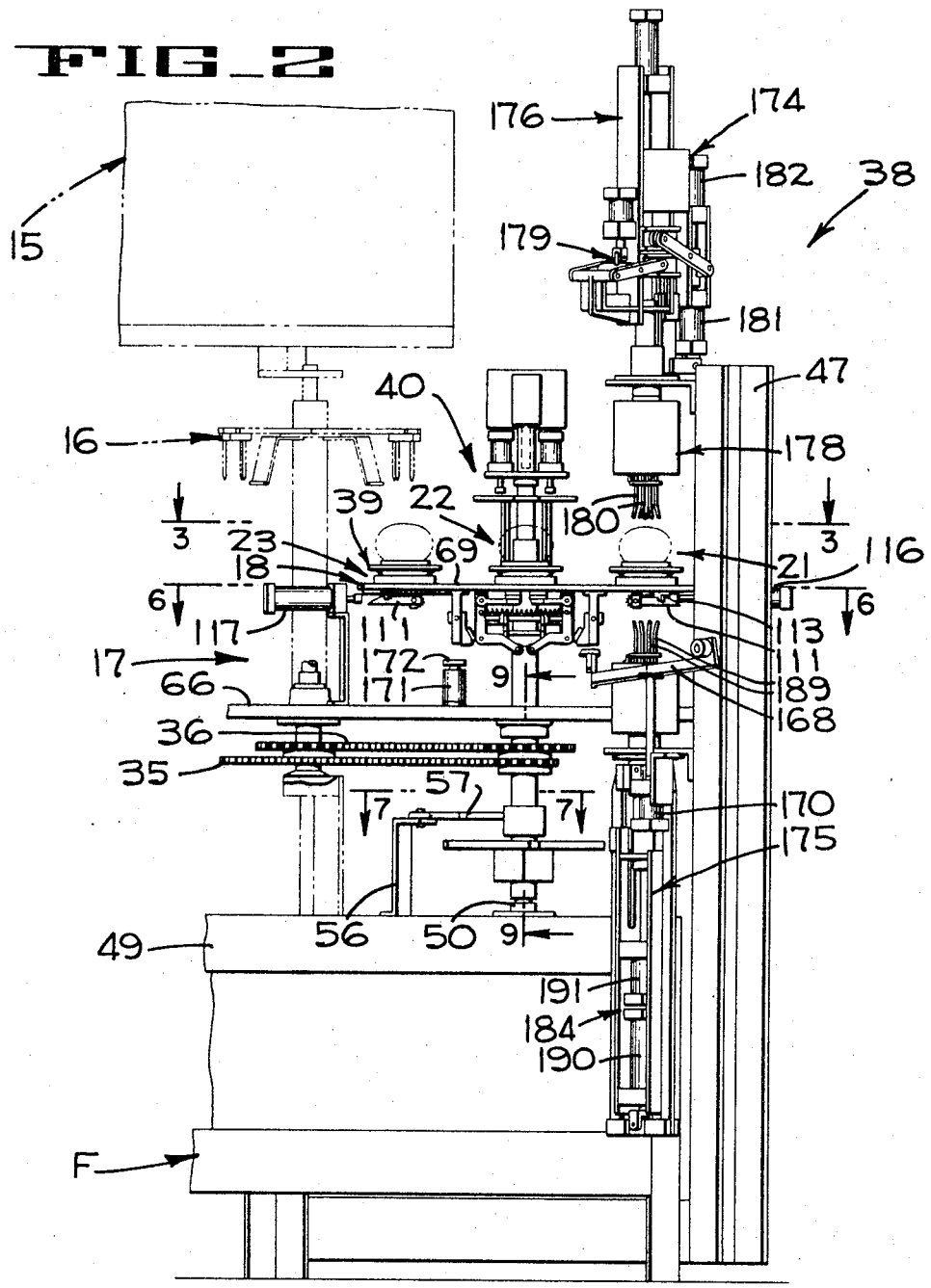

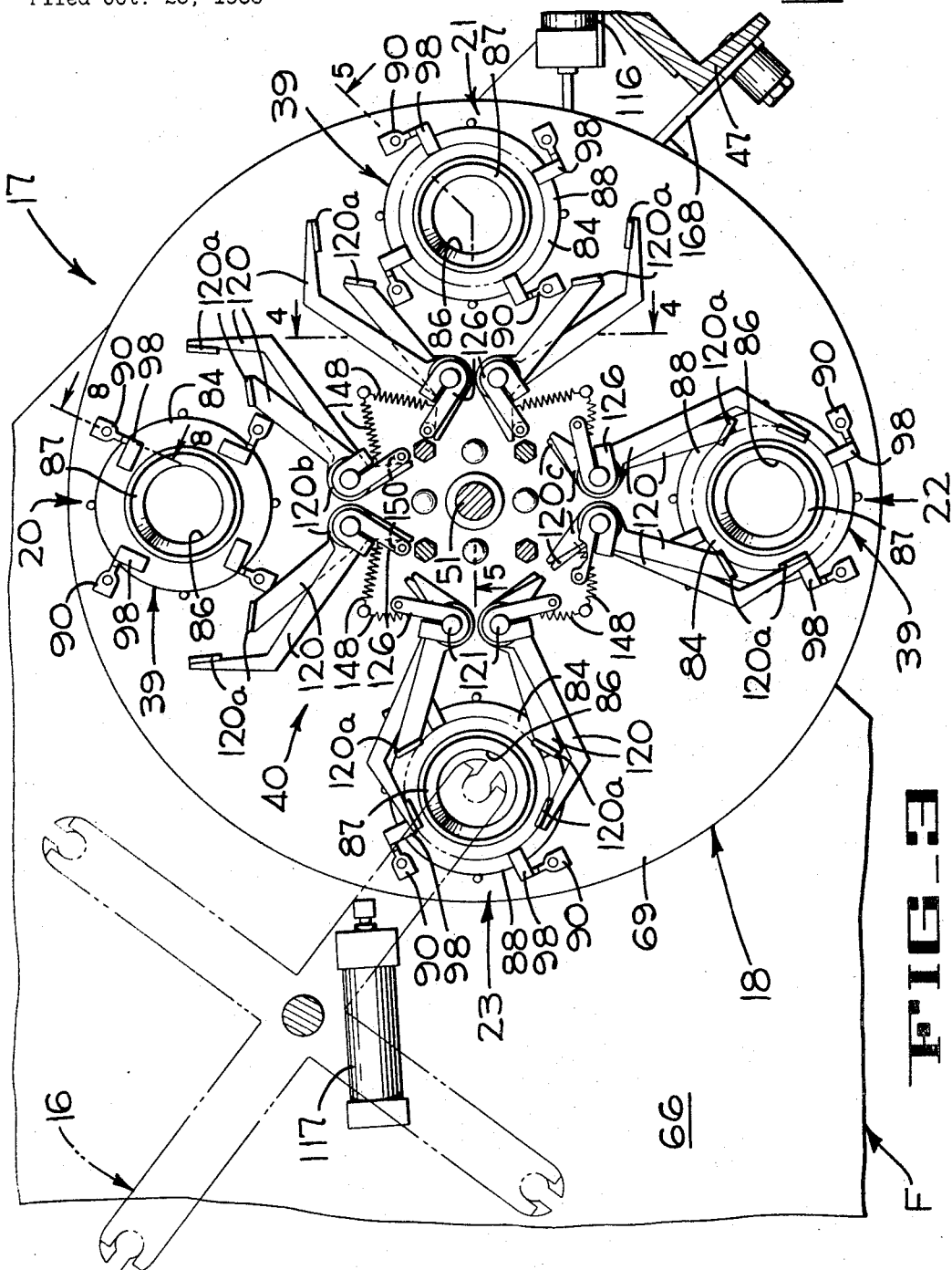

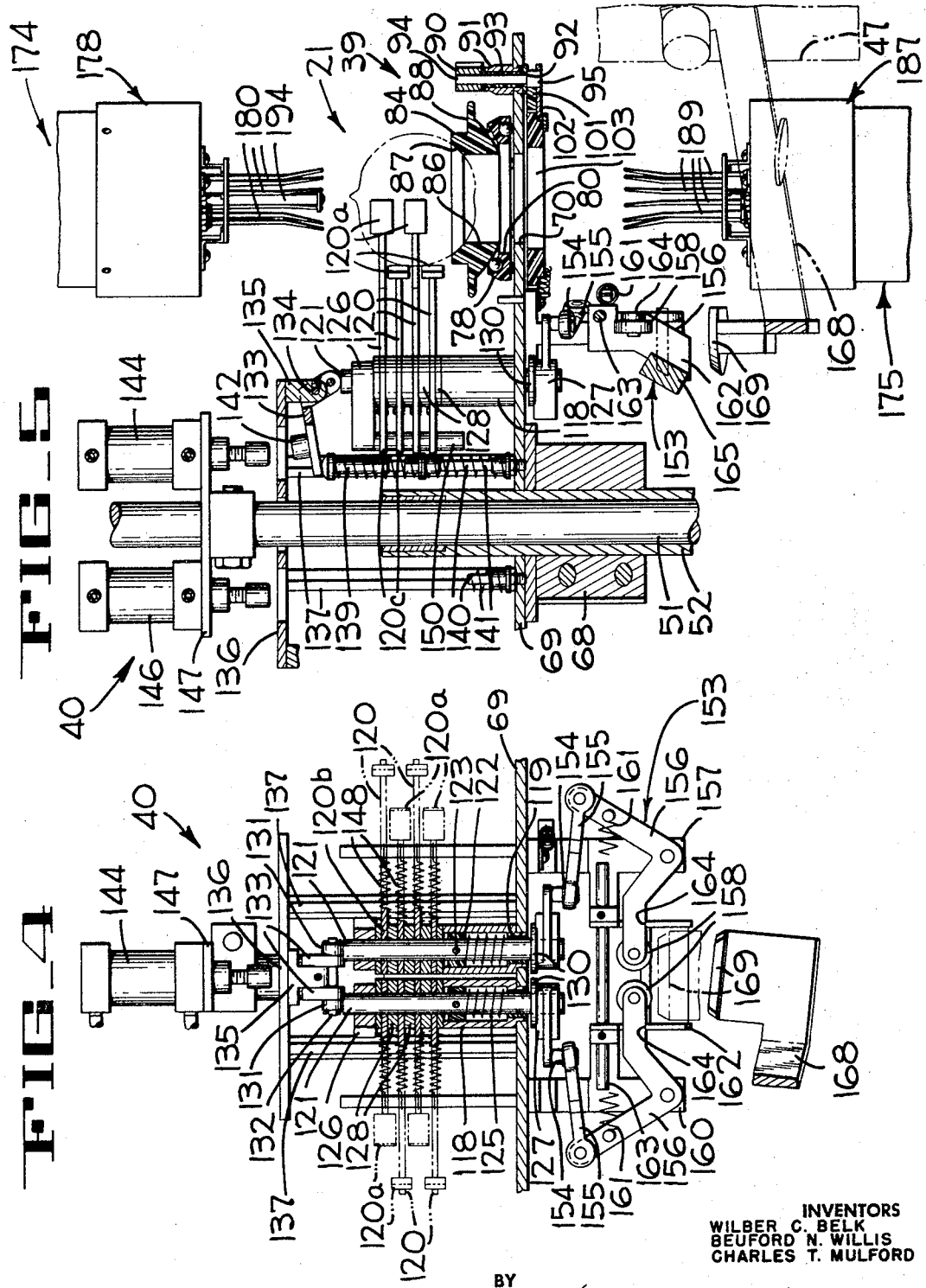

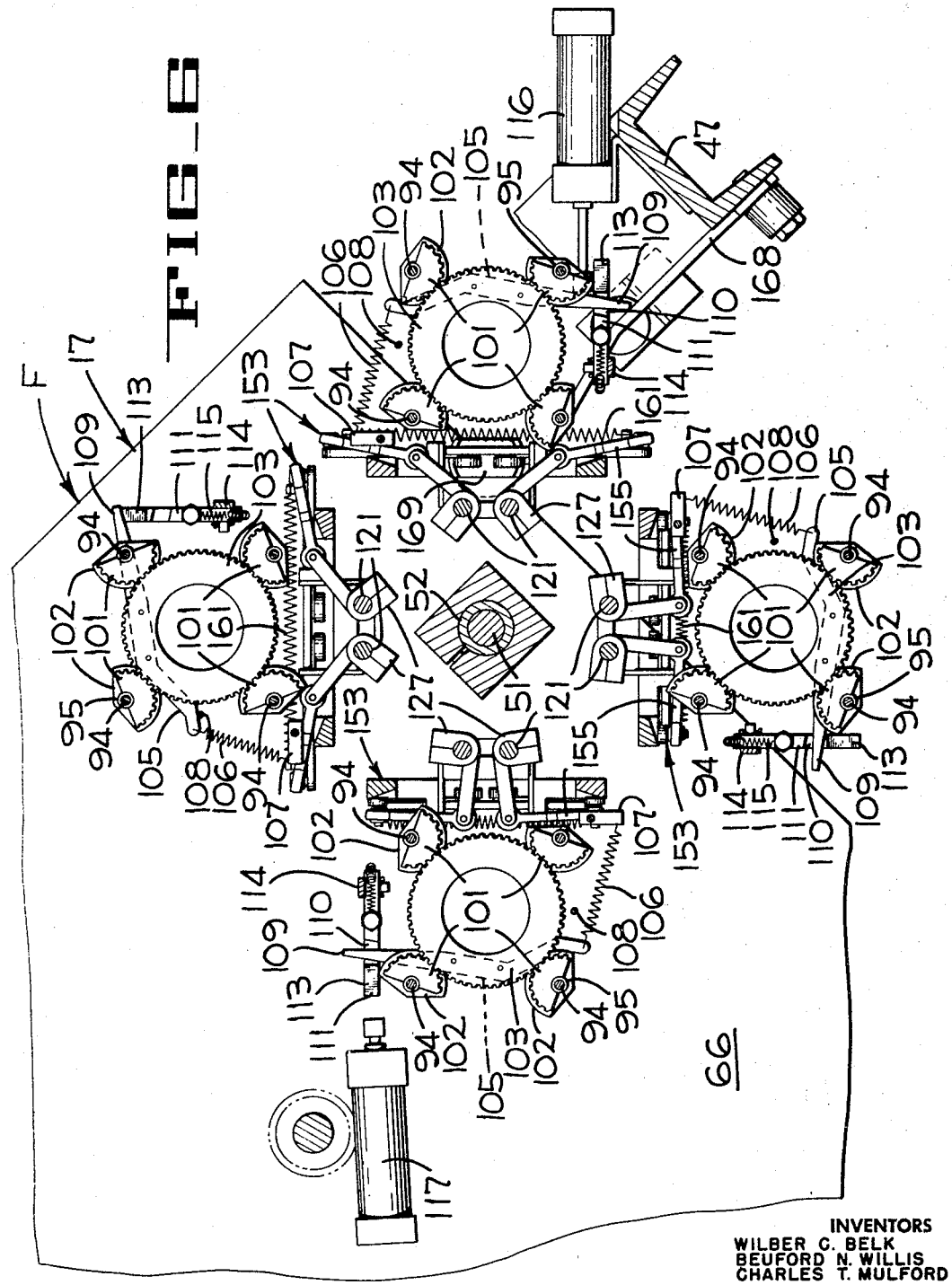

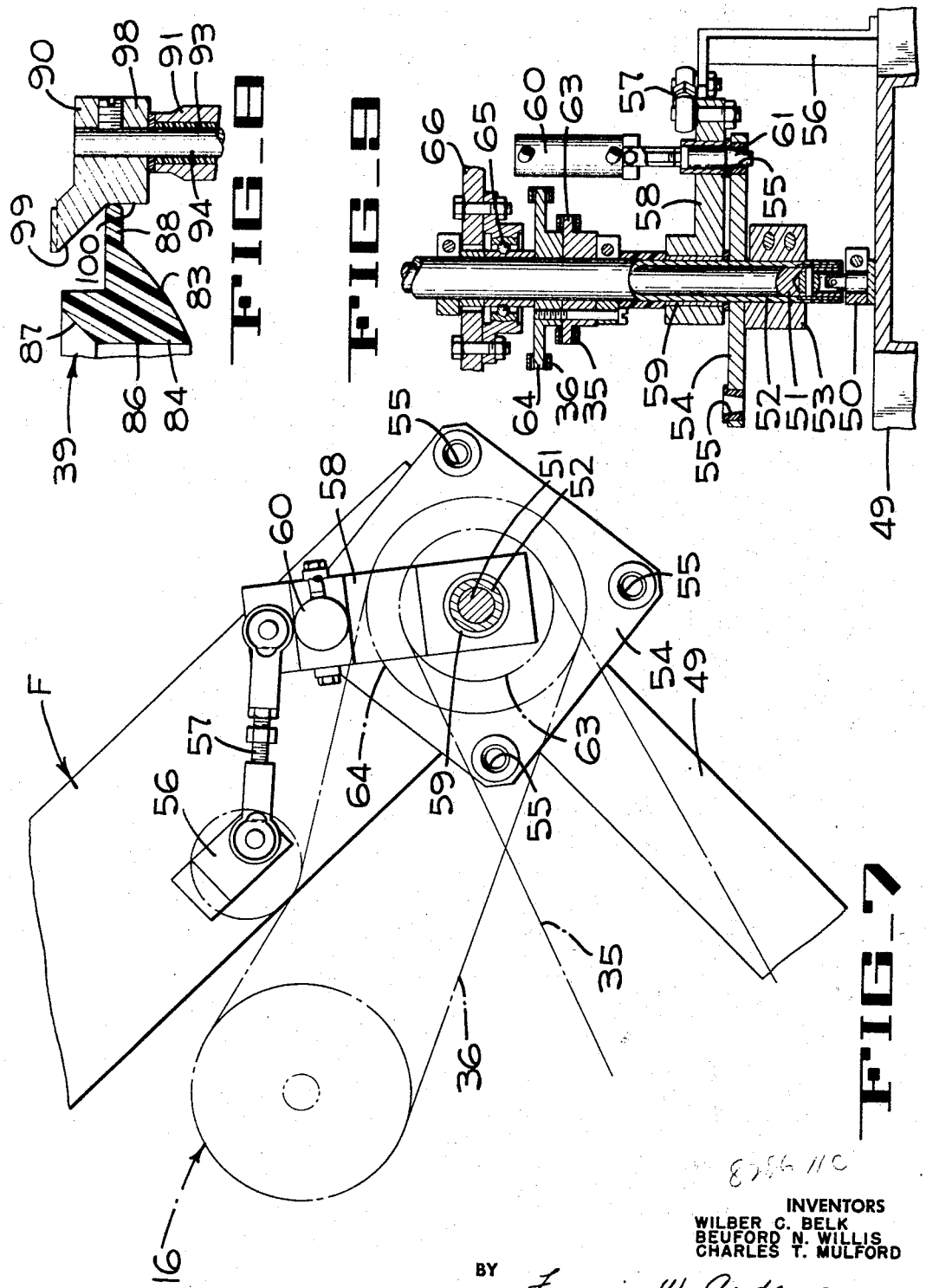

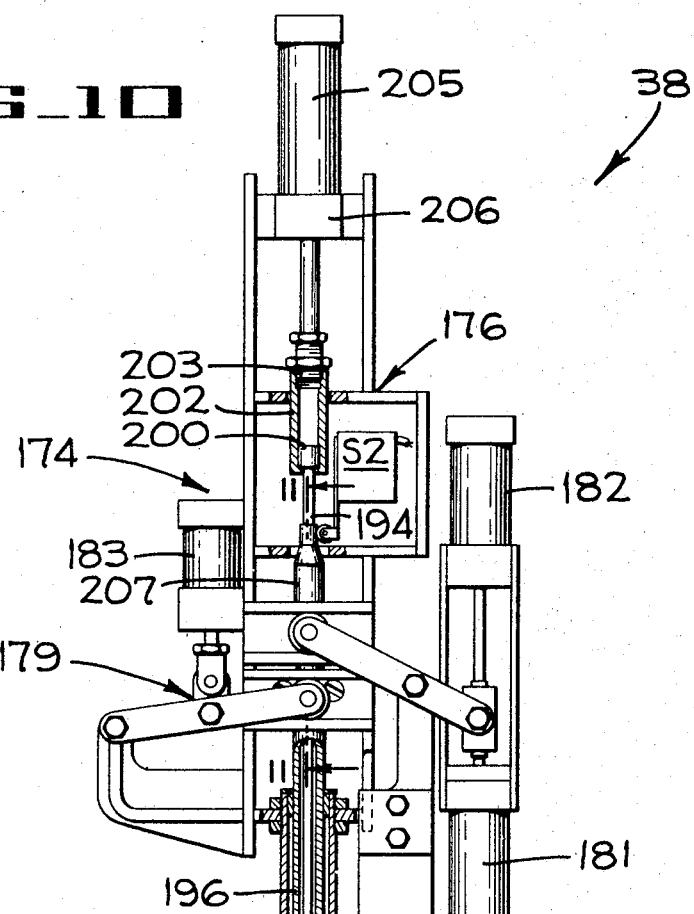
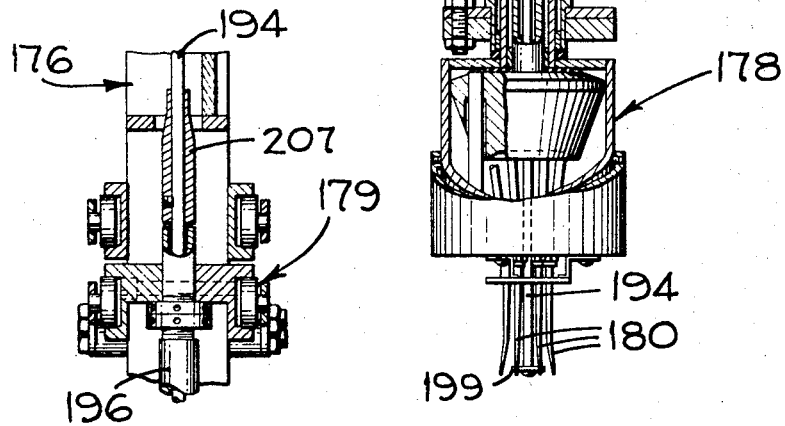

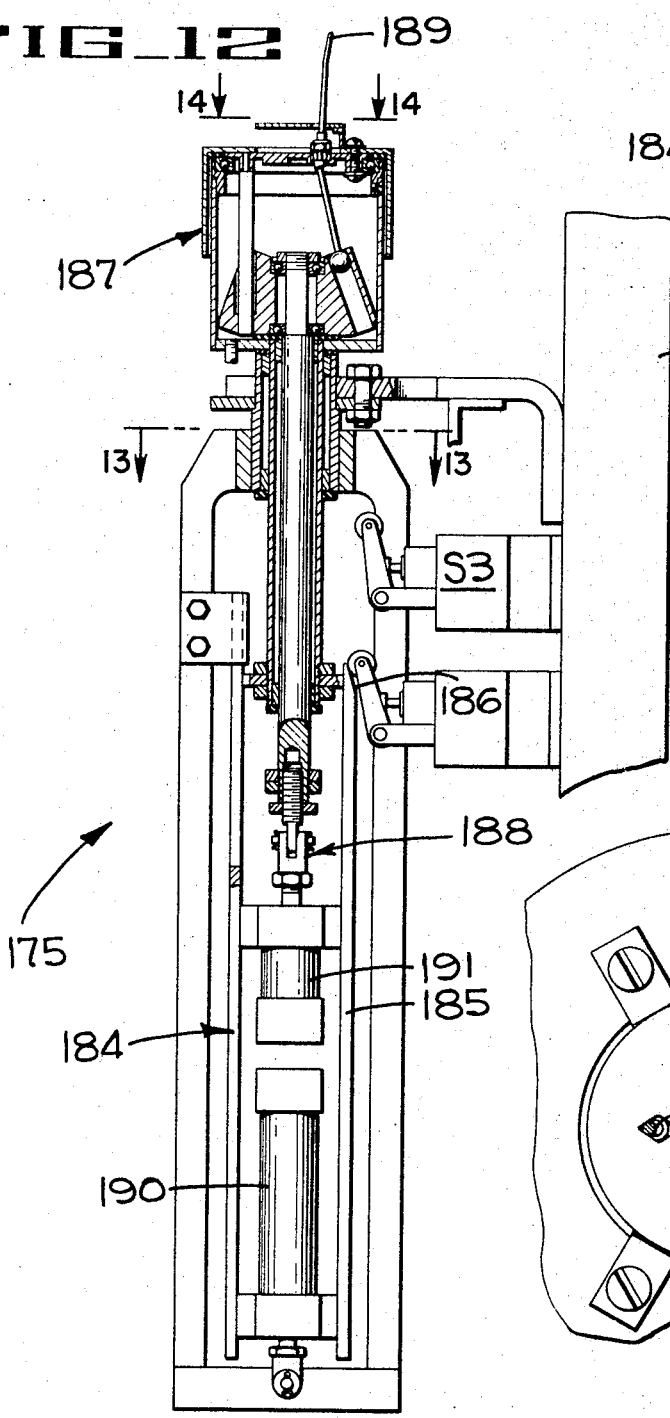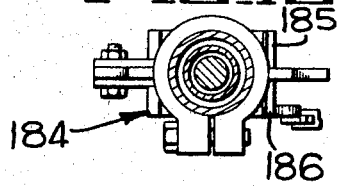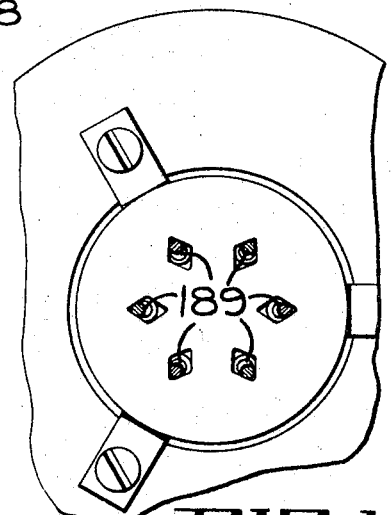

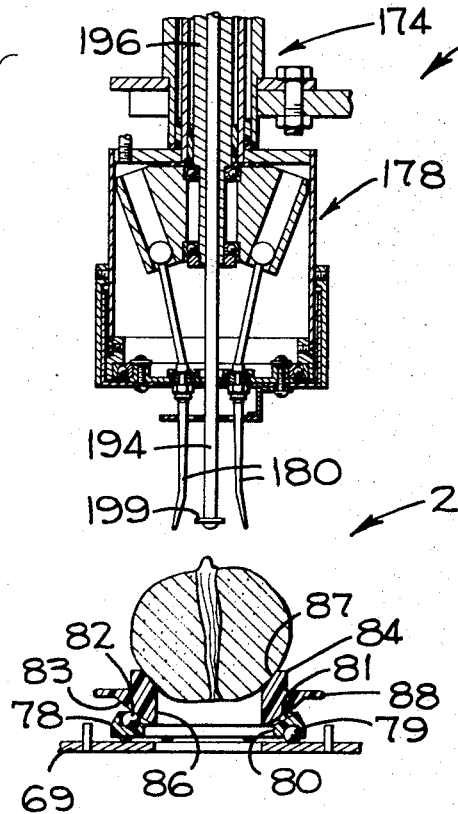
FIG_15
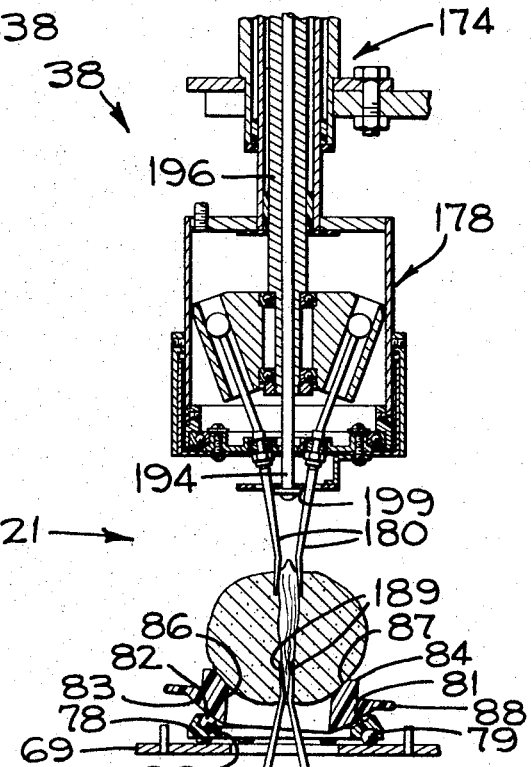
FIG_16
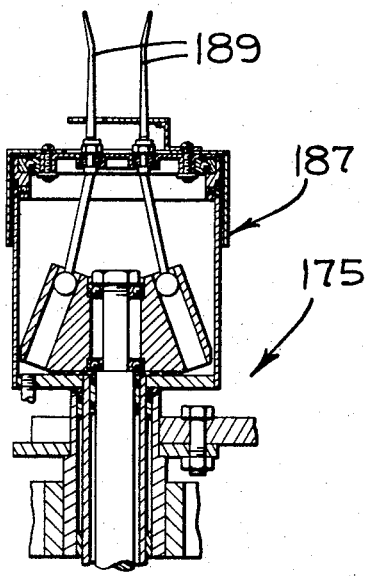
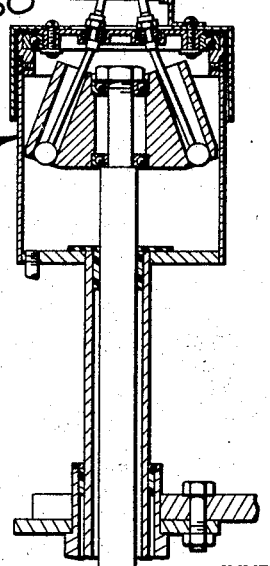

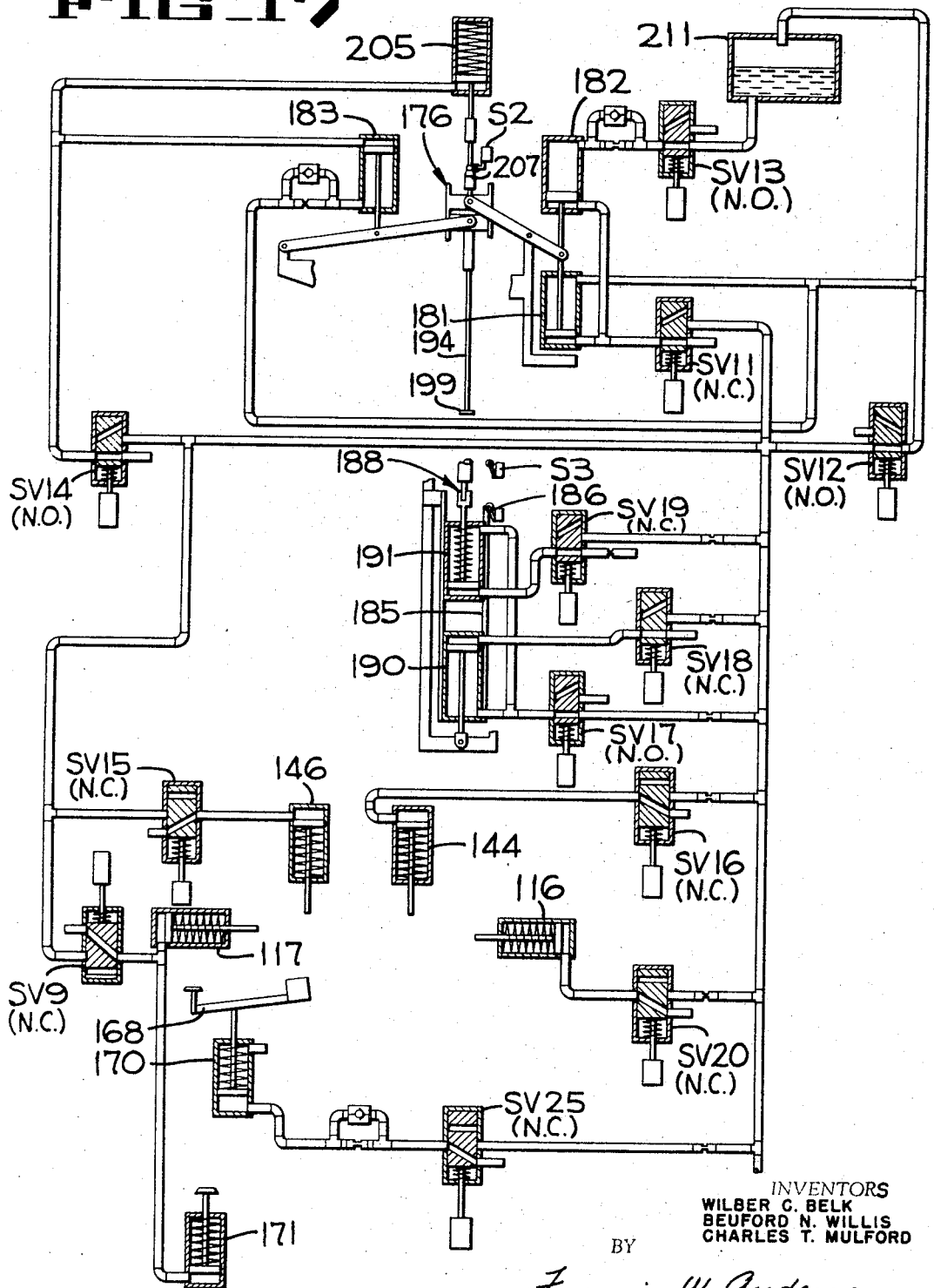

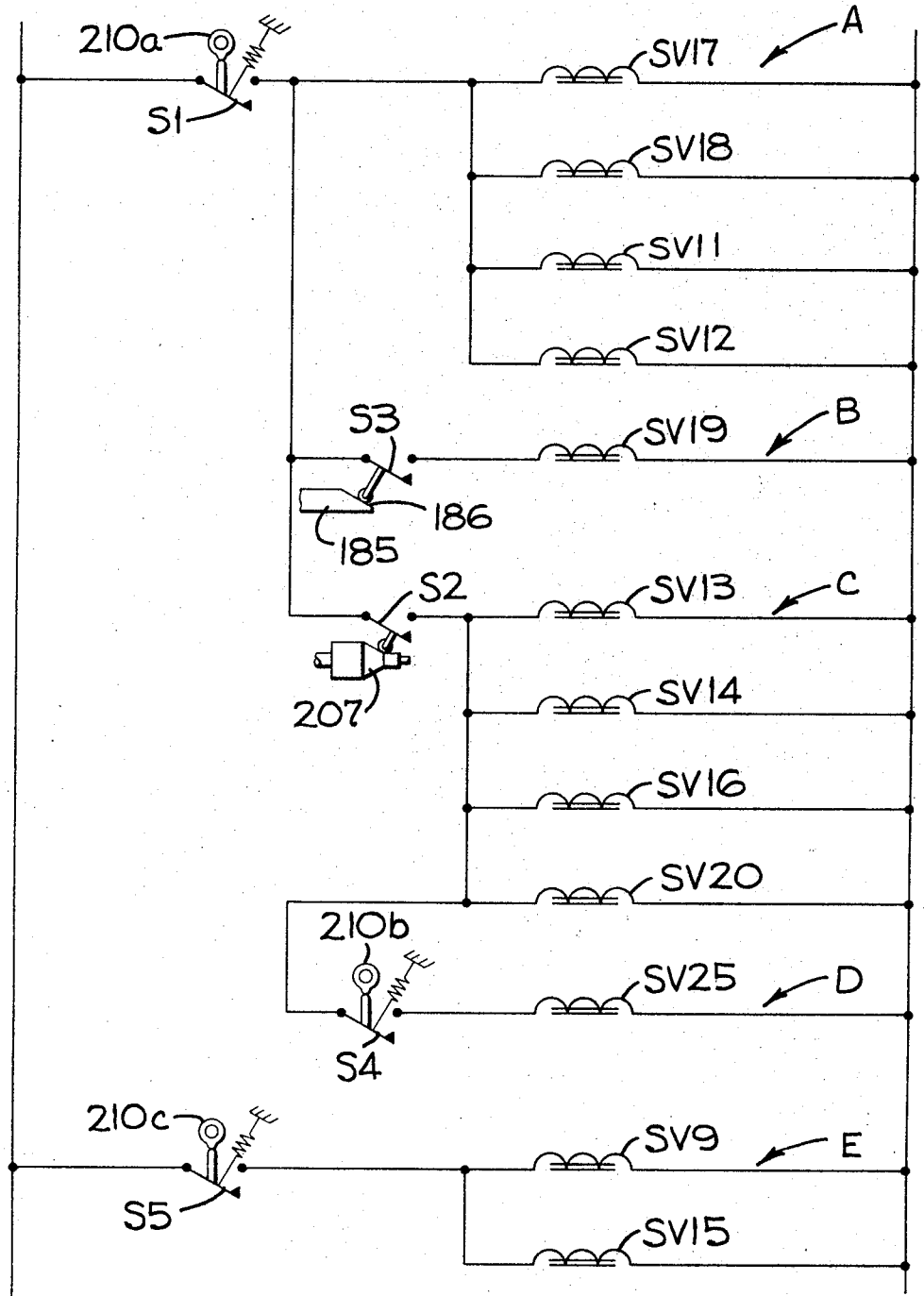
FIG_18

3,448,845
FRUIT-HANDLING APPARATUS
Wilber C. Belk and Beuford N. Willis, Lakeland, and Charles T. Mulford, Auburndale, Fla., assignors to FMC Corporation, San Jose, Calif., a corporation of Delaware
Filed Oct. 25, 1966, Ser. No. 589,315
Int. Cl. B65g 47/24, 47/80
U.S. Cl. 198—33                   18 Claims

ABSTRACT OF THE DISCLOSURE

A grapefruit is properly aligned for subsequent transfer to a sectionizing machine by means for a pair of clusters of pins which surround and engage the core at each end of the fruit and bring it into vertical alignment. The grapefruit is positioned upon a support member which permits it to move both laterally and angularly during the aligning operation, and gripping fingers are provided to close upon the grapefruit after the aligning operation to maintain the grapefruit in its properly oriented position while it is moved to the sectionizing machine.

---

This invention pertains to a fruit handling apparatus and more particularly concerns a device for positioning fruit preparatory to sectionizing the fruit.

In sectionizing fruit it is often necessary that they be positioned so that their axes have a predetermined orientation before the sectionizing tools are moved into engagement with them. Particularly is this so in the case of citrus fruit. For example, in sectionizing grapefruit in one type of machine, it is necessary that the stem-blossom axis of each of the fruit be disposed in a vertical position when the fruit are placed into the sectionizing machine. Heretofore, it has been difficult to obtain this positive orientation and to maintain this orientation while the fruit is being moved to a subsequent sectionizing station.

One of the prior art machines for sectionizing fruit and positioning the fruit prior to sectionizing is shown in the patent to Polk, 3,132,734. In general, that patent shows a type of machine for aligning the fruit, transferring the aligned fruit to a sectionizer, and sectionizing the fruit in the sectionizer. The instant invention pertains primarily to that part of these sectionizing machines, like the Polk machine, having to do with obtaining the proper alignment of the fruit and maintaining the alignment prior to transferring the fruit to the sectionizer.

It is an object, therefore, of this invention to provide an improved apparatus for aligning fruit and for holding the fruit in an aligned position.

Another object of the invention is to provide an improved apparatus for supporting a fruit for free lateral and angular movement.

Still another object of the invention is to provide an improved apparatus for gripping the fruit and holding it in a properly aligned position while the fruit is moved to a subsequent handling station.

Another object is to provide a fruit holding mechanism which can conform to the shape of the fruit and remain in gripping engagement with the fruit while the fruit are being moved.

Another object is to provide a fruit aligning and holding apparatus wherein the fruit is penetrated and moved at each end into an aligned position and subsequently is held in the aligned position at a plurality of points on its circumference.

Yet another object of the invention is to provide an apparatus for sensing the size of a fruit and moving a plurality of pins into the fruit a predetermined distance in response to the sensing device and then closing the pins on the core material of the fruit.

Other objects and advantages will be apparent from the following detailed description of the invention accompanied by the drawings in which:

FIGURE 1 is a schematic plan of one embodiment of the fruit handling apparatus showing its location with respect to parts of a fruit sectionizing machine with which it may be used.

FIGURE 2 is an elevation, partly broken away, of the apparatus shown in FIGURE 1 and as viewed generally in the direction of the arrows 2—2 of FIGURE 1.

FIGURE 3 is an enlarged horizontal section taken along the line 3—3 of FIGURE 2.

FIGURE 4 is an enlarged vertical fragmentary section taken generally along the line 4—4 of FIGURE 3.

FIGURE 5 is an enlarged vertical fragmentary section taken generally along the line 5—5 of FIGURE 3.

FIGURE 6 is an enlarged horizontal section taken generally along the line 6—6 of FIGURE 2.

FIGURE 7 is an enlarged fragmentary section taken generally along the line 7—7 of FIGURE 2.

FIGURE 8 is an enlarged fragmentary section taken generally along the line 8—8 of FIGURE 3.

FIGURE 9 is an enlarged fragmentary section taken generally along the line 9—9 of FIGURE 2.

FIGURE 10 is an enlarged elevation, partly in section and with parts broken away, taken generally along the line 10—10 of FIGURE 1.

FIGURE 11 is an enlarged fragmentary section taken along the line 11—11 of FIGURE 10.

FIGURE 12 is an enlarged elevation, partly in section and with parts broken away, taken generally along the line 12—12 of FIGURE 1.

FIGURE 13 is an enlarged fragmentary section taken along the line 13—13 of FIGURE 12.

FIGURE 14 is an enlarged fragmentary section taken along the line 14—14 of FIGURE 12.

FIGURE 15 is an enlarged fragmentary section showing a fruit in position to be aligned.

FIGURE 16 is an enlarged fragmentary section showing a fruit in an aligned position.

FIGURE 17 is a schematic pneumatic diagram.

FIGURE 18 is a schematic wiring diagram.

The general description of the preferred embodiment of the invention is best obtained by referring to FIGURE 1 wherein the reference numeral 15 indicates generally a grapefruit sectionizer with which the instant invention is employed. A transfer mechanism 16 and a fruit handling apparatus or feeder 17 are associated with the sectionizer, the feeder moving the fruit to the transfer mechanism which, in turn, places the fruit in the sectionizer. The feeder comprises a rotary turret 18 which moves clockwise, as viewed in FIGURE 1, through an input station 20, a centering or aligning station 21, an inactive station 22, and a transfer station 23. The fruit are individually placed on the feeder at the input station, they are then aligned at the centering station and finally are picked up at the transfer station by the transfer mechanism which also rotates in a clockwise direction in timed relation with the feeder. The transfer mechanism places the fruit in the sectionizer which also is moved in a clockwise direction in timed relation with the transfer mechanism. Details of the sectionizer may be obtained from the aforementioned Polk Patent 3,132,734. Details of the transfer mechanism may also be obtained from that patent and additionally from the earlier patent to Polk, 3,030,990, and Grotewold Patent 3,259,253.

The drive for the apparatus is shown in dotted lines in FIGURE 1 and includes a motor 25 which is mounted on the sectionizer and is connected through a conventional belt drive 26 to a vertical shaft 27. A horizontal shaft 28 which is driven from the shaft 27 through a worm gear drive 29, drives a second vertical shaft 30 by means of a bevel gear drive 31. The vertical shaft 30 effects intermittent movement of the sectionizer through a Geneva drive mechanism 32. The drive is conventional and the details thereof are similar to the drive shown in the aforementioned patent to Polk, 3,132,734.

The feeder turret 18 is connected to the Geneva drive mechanism 32 by a long chain drive 35. A second smaller chain drive 36 connects the feeder turret with the transfer mechanism. As can be readily seen, the motor 25 which drives the sectionizer also drives the feeder and the transfer mechanism in timed relation with the sectionizer.

As best shown in FIGURE 2 the feeder 17 is comprised of supporting structure and three general units, namely, an aligner 38, a fruit supporting mechanism 39 and a fruit holding assembly 40.

The supporting structure comprises an upright frame member 47 which is fixed to the main framework F of the sectionizing machine. The main framework includes a horizontal frame member 49 which mounts the lower end of the rotary turret 18. The rotary turret 18 includes a block 50 which pivotally mounts a stationary shaft 51 (FIG. 9). A rotary tube 52 is journalled on the stationary shaft. A collar 53 is fixed to the rotary tube and has mounted thereon a square guide plate 54. The guide plate is apertured at each of its four corners as at 55 (FIG. 7) and is used to assure that proper alignment is maintained between the rotary turret, transfer mechanism and sectionizer.

To assure that the rotary turret 18 is always in a properly aligned position there is also fastened on the horizontal frame member 49 an upright bracket 56. An adjustable link 57 is connected between the top of the upright bracket and a mounting arm 58 rotatably mounted on the rotary tube by a bushing 59. A pneumatic actuator 60 is mounted on the mounting arm and has connected to its actuating rod a conical pawl 61 (FIG. 9). As was noted above, the link 57 is adjustable so that the position of the actuator and pawl relative to the rotary position of the guide plate 54 may be varied. In this manner when the pneumatic actuator is energized the pawl is driven into one of the apertures. If the guide plate is slightly out of alignment due to play in the chain 35, the pawl will center itself in the aperture and move the guideplate and the rotary turret into its properly aligned position.

Fixed to the rotary tube 52 above the mounting arm 58 is a sprocket 63 which receives the chain 35 from the sectionizer. Also fixed to the rotary tube is an upper sprocket 64 which receives the chain 36 from the transfer mechanism 16. A bearing assembly 65 rotatably supports the tube approximately at its midpoint in a second horizontal frame member 66. Fixed to the rotary tube 52 adjacent its upper end is a clamp 68 (FIG. 5), which is fastened to a horizontal feeder table 69. The feeder table is circular and is apertured at four equally spaced locations as at 70 (FIG. 5). The apertured feeder table supports the fruit supporting mechanisms 39 and moves them intermittently through each of the stations.

The fruit supporting mechanism 39 is best described by referring to FIGURES 5, 6 and 8. The numeral 78 indicates a base having a plurality of spaced recesses in its underside to receive ball bearings 79. The ball bearings support the base on the feeder table 69 for movement in all directions along the table. The base is provided with a large central aperture 80 and a concave upper wall 81. The upper wall is also provided with a plurality of recesses to receive a second set of ball bearings 82. Resting on the ball bearings 82 is the lower convex surface 83 of a fruit carrying cup 84. The fruit carrying cup is provided with a large central aperture 86 and an enlarged conical bore 87 the sides of which support the fruit. Extending radially outwardly from the fruit carrying cup is a circular centering flange 88 (FIG. 8). As can be readily seen the fruit carrying cup can move angularly on the base while the base moves horizontally on the feeder table. In this manner the fruit placed in the cup is free to move angularly and laterally in any direction.

It is necessary to center the fruit carrying cup 84 and the base 78 after each cycle of operation and for this purpose a plurality of retainer clips 90 (FIGS. 3 and 8) are provided. Each of the retainer clips includes a tubular support 91 which is fixed at its lower end into an aperture 92 in the feeder table 69. A bushing 93 is mounted in the tubular support and slidably receives a small shaft 94 having an enlarged lower head 95. A washer separates the top side of the head from the underside of the tubular support whereas another washer separates the top side of the tubular support from a cam 98 which is fixed to the shaft 94. As best shown in FIGURE 8 the cam has an inclined cam surface 99 and a vertical cam surface 100. The inclined cam surface in cooperation with the inclined cam surfaces of the other three retaining clips are simultaneously moved into engagement with the centering flange 88 of the fruit carrying cup 84 to re-align the flange in a horizontal position. Likewise the vertical cam surface 100 cooperates with the cam surfaces of each of the other three retainer clips to center the centering flange 88 horizontally so that the center of the conical bore 87 is in line with the vertical center line drawn between the clusters of upper and lower centering pins 180 and 189 respectively.

In order to effect simultaneous movement of each of the cams 98 a rack and pinion mechanism is provided. As best shown in FIGURES 5 and 6 a pinion gear 101 is fixed to the head 95 of each of the shafts 94. A semicircular plate 102 is fastened to the underside of each of the pinion gears and extends radially outward to provide a supporting surface for an interengaging circular ring gear 103. As can be readily seen rotation of the ring gear will effect simultaneous rotation of each of the pinion gears and, accordingly, the simultaneous rotation of each of the cams 98.

In order to rotate the ring gear a lever rod 105 is fixed to the underside of the ring gear and is connected by a spring 106 to a small clip 107 which is anchored to the underside of the feeder table 69. A pin 108 is also anchored to the underside of the feeder table and acts as a stop to limit the movement of the lever rod. The free end of the lever rod is tapered as at 109 and extends outwardly from the ring gear and is received in a notch 110 of a latch 111. As best shown in FIGURE 2 the latch also has a beveled outer end 113 which acts as a cam surface against which the tapered end of the lever rod can slide over. The latch is pivotally mounted to a bracket 114 which is anchored to the underside of the feeder table. A spring 115 is connected to the latch to bias the beveled end thereof upwardly toward the underside of the feeder table. A pneumatic actuator 116 is fastened to the upright frame member 47 with its actuating rod aligned with the tapered end of the lever arm. When the actuator is energized its actuating rod is extended and pushes against the tapered end of the lever arm to rotate the ring gear clockwise, as viewed in FIGURE 6, and move it into the notch of the latch 111. When the actuating rod of the pneumatic actuator 116 is retracted the lever arm will be retained in the notch of the latch. When the lever arm is in the latched position the cam 98 will have been swung counterclockwise, as viewed in FIGURE 3, out of engagement with the centering flange 88 of the fruit carrying cup 84 thus releasing the fruit carrying cup and the base for unrestricted movement.

A similar pneumatic actuator 117 is provided at the transfer station 23 in a position such that its actuating rod strikes the beveled end 113 of the latch when energized. When the actuator strikes the latch, it is pushed downward to release the lever rod 105 and allow the spring 106 to roate the ring gear 103 and center the fruit carrying cup 84.

The fruit holding assembly 40 is best shown in FIGURES 3–5 and includes a pair of posts 118 which are fixed in apertures 119 (FIG. 4) in the feeder plate 69. Each of the posts supports a set of gripping fingers 120 in identical fashion; therefore, only one of the posts and set of fingers will be described it being understood that the description is applicable to both posts and sets of fingers. Each set of gripping fingers includes two short and two elongated and bent fingers. Each finger is provided with a rectangular pad 120a for engaging the fruit at its outer end, an apertured disc portion 120b, and an inner radial extension 120c.

Slidably mounted in each post 118 of the fruit holding assembly 40 is a shaft 121 which is circumscribed near its center by a circular pad 122. The pad is pinned to the shaft by a roll pin 123. A coil spring 125 circumscribes the shaft and pushes against the underside of the circular pad to bias the shaft upwardly. An upper clamp arm 126 is fixed to the upper end of the shaft and a lower clamp arm 127 is fixed to the bottom end of the shaft. Rotation of either of the clamp arms thus affects rotation of the shaft and the other clamp arm.

Circumscribing the shaft 121 and positioned between the upper clamp arm 126 and the top surface of the post 118 are alternating washers or spacers 128 and the disc portions 120b of the gripping fingers 120. In other words, starting from the upper clamp arm there is a washer, then a finger, another washer, and so on down to the last washer which abuts against the top of the post. An additional washer 130 circumscribes the lower end of the shaft between the feeder table 69 and the lower clamping arm 127. Obviously if the shaft 121 is moved downwardly the upper clamp arm will push against the washers and gripping fingers to squeeze them against the post. Such squeezing will frictionally hold the gripping fingers in the position in which the fingers lie at the moment the squeezing takes place. The fingers are being squeezed in the position shown in FIGURES 4 and 5. If the pressure is released from the upper side of the shaft the fingers will be free to rotate about the shaft.

In order to effect the squeezing of the gripping fingers a set of cam rollers 131 (FIG. 4) are positioned on an elongated pin 132 which passes through apertures in a forked elbow link 133. The elbow link is mounted on a pin 134 which passes through an anchor post 135. The anchor post is fixed to a horizontal plate 136 which is fixed to the feed table 69 by a plurality of vertical supports 137. The inner end of the elbow link abuts against a plunger 139 which is slidably mounted on a shaft 140 which is fixed to the top of the feeder table. A coil spring 141 biases the plunger upwardly from the shaft. As can be readily seen, in the position shown in FIGURE 5 the plunger is applying pressure on the end of the elbow link causing the cam rollers to press downwardly on the shafts 121 thus frictionally squeezing the fingers 120.

In order to release the fingers it is necessary that the elbow link 133 be pivoted counterclockwise against the pressure of the plunger 139. To accomplish this a buffer pad 142 is fixed to the top surface of the elbow link in alignment with the actuating arm of a pneumatic actuator 144. An aperture in the horizontal plate 136 provides access to the buffer pad for the actuating rod of the pneumatic actuator. When the pneumatic actuator is energized its actuating rod will strike the buffer pad to push the end of the elbow link downwardly against the plunger. This will pivot the cam rollers out of engagement with the shaft 121 allowing the coil spring 125 to raise the shaft thus freeing the gripping fingers 120. It should be noted that the pneumatic actuator 144 is positioned adjacent the aligning station 21; however, a similar pneumatic actuator 146 is positioned to perform a similar function adjacent the transfer station 23. Both of the pneumatic actuators are mounted on a clamp bracket 147 which is fixed to the stationary shaft 51.

As thus far described it can be seen that the gripping fingers 120 are free to pivot when the pneumatic actuator 144 is energized and may be frictionally held when the pneumatic actuator is retracted. As best shown in FIGURES 3 and 4 each of the gripping fingers is biased toward the fruit supporting mechanism 39 by a spring 148. Thus, when the squeezing pressure is released from the fingers they will tend to close toward the fruit supporting mechanism. However, means is also provided for simultaneously opening all of the gripping fingers and for latching them in an opened position at a particular station.

To open all the fingers simultaneously the upper clamping arm 126 is provided with an abutment pin 150 which acts against the radial extension 120c of each of the gripping fingers 120 such that rotation of the shaft 121 and the upper clamping arm will cause the abutment pin to engage the radial extensions of the gripping fingers to swing each of the fingers simultaneously outwardly away from the fruit supporting mechanism 39.

In order to rotate the post 118 to swing the gripping fingers 120 away from the fruit supporting mechanism 39 and to positively lock the gripping fingers into an open position a latching mechanism 153 is provided. As best shown in FIGURES 4 and 5 each of the lower clamp arms 127 is provided with a conventional ball connector 154. The ball connector is received in a socket of an adjustable link 155 which in turn is pivotally connected by another ball connector to a generally V-shaped bell crank 156. The V-shaped bell crank is pivotally mounted at its apex on a righthand support leg 157 which is fastened to the underside of the feeder table 69. A roller 158 is pivotally mounted to the free end of the bell crank. A similar set of the above described actuating members is provided for rotating the shaft 118 for the opposed set of gripping fingers. This set of actuating members is attached to a left hand support leg 160. A spring 161 joins the two V-shaped bell cranks such that the rollers are normally biased downwardly, as viewed in FIGURE 4.

In order to lock the rollers 158 in their uppermost positions and thus lock the gripping fingers open a latch 162 is pivotally mounted on a rod 163 which is fixed between the righthand and lefthand support legs 157 and 160. The latch is provided with a pair of opposed notches 164 and an inclined pad 165. The latch is normally swung by gravity in a counterclockwise direction, as viewed in FIGURE 5, and when the rollers 158 are in their uppermost positions the arms of the V-shaped bell cranks 156 will rest in the notches 164 of the latch. The pressure of the spring 161 will hold the arms of the bell cranks against the notches positively locking the arms in the raised position.

For the purpose of unlatching the rollers 158 a lever arm 168 is pivoted to the frame member 47 (FIG. 2) and is provided with an enlarged flat head 169 which extends directly beneath the latch 162. As the head of the lever arm is raised it strikes the pad 165 pushing the latch in a clockwise direction to release the arms of the V-shaped bell cranks 156 from the notches 164. The rollers 158 then fall on to the flat head and are held thereby. The lever arm is moved by the actuating rod of a pneumatic actuator 170 (FIGS. 2 and 17) which when energized can raise the lever arm quickly but on its downstroke is slowly bled through a restriction in a flow control valve to lower the lever arm slowly. Consequently the rollers also are lowered slowly allowing the gripping fingers 120 to close slowly on the fruit in the fruit supporting mechanism 39 and thus prevent damage to the fruit.

The gripping fingers are raised at the transfer station 23 by raising rollers 158 to allow the latch 162 to swing into a locking position. For this purpose a pneumatic actuator 171 (FIG. 2) having an actuating rod with an enlarged head 172 is fixed to the horizontal frame member 66. The head is in alignment with the rollers 158 such that when the actuator is energized the head will strike the rollers and raise them to their uppermost positions at which time the latch 162 will swing into a locking position. When the head is released the V-shaped bell cranks 156 will be locked in the position shown in FIGURE 4 and the gripping fingers 120 will be opened.

In summary, it can be seen that the gripping fingers can be positively locked open or when unlocked they can be frictionally held by the cam rollers 131. When unlocked and when not frictionally held the gripping fingers are free to close on a fruit at a slow rate as the flat head 169 of the lever arm 168 is slowly retracted.

The aligner 38 is described and claimed in the copending commonly assigned application of W. C. Belk, entitled Article Aligning Device and Method, Serial No. 589,277, and filed concurrently herewith, with the exception of one feature of the aligner which will be described hereinbelow. For the purpose of the instant application, however, a brief general description of the aligner will be given. As best shown in FIGURES 2, 10–16 the aligner comprises an upper centering mechanism 174, and a lower centering mechanism 175. The upper centering mechanism comprises a rectangular support frame 176, an upper centering assembly 178 and an upper centering pin actuating assembly 179. A plurality of centering pins 180 are provided in the centering assembly and when closed in a cluster around the core material of a fruit will move that end of the fruit into alignment with the axis of the cluster.

The rectangular support frame 176 along with the centering assembly 178 and the centering pin actuating assembly 179 are lowered and raised by a pneumatic actuator 181 and an hydraulic-pneumatic actuator 182. A pneumatic actuator 183 is included in the centering pin actuating asembly to open and close the centering pins 180.

The lower centering mechanism 175 is best shown in FIGURE 12 and comprises a lower rectangular frame 184 which includes a righthand vertical bar 185. The righthand vertical bar is beveled at its upper end to form a cam surface 186. The lower centering mechanism also includes a lower centering assembly 187 and a lower centering pin actuating assembly 188. A plurality of centering pins 189 are provided in the centering assembly and when closed in a cluster around the core material of a fruit will move that end of the fruit into alignment with the axis of the cluster.

The lower rectangular frame 184 along with the centering assembly 188 are raised and lowered by a pneumatic actuator 190. A pneumatic actuator 191 is included in the centering pin actuating assembly 188 to open and close the centering pins 189.

One particularly advantageous feature of the aligner 38 is the means for sensing the height of the fruit in the fruit supporting mechanism 39 and limiting downward movement of the centering pins 180. This means includes a probe tube 194 which is positioned and is free to move within an actuating tube 196. The actuating tube operates the in and out movement of the centering pins. For the purpose of this description it should suffice to point out that the actuating tube is part of the upper centering pin actuating assembly 179 and is raised and lowered relative to the rectangular support frame 176 by the pneumatic actuator 183. The lower end of the probe tube is provided with a probe tip 199 in the form of a flat ring which engages the fruit. The upper end of the probe tube is fastened to a cylindrical cap 200 which is slidably positioned in a lifting cup 202. The lifting cup is threaded internally at its upper end to receive a threaded cylindrical plug 203. Adjustably threaded into a hole in the top of the cylindrical plug is the lower end of an actuating rod of a pneumatic actuator 205. The pneumatic actuator is fastened to a crossbar 206 of the rectangular support frame 176 such that upon retraction of its actuator rod the lifting cup pulls the probe tube upwardly relative to the rectangular support frame.

A cam member 207 is fastened to the probe tube 194 adjacent its upper end and when the probe tube is raised relative to the rectangular support frame 176 engages the arm contact of a switch S2. The switch controls the operation of the pneumatic actuators as will be later described. Briefly, however, the switch stops downward movement of the rectangular support frame and thus limits the penetration of the centering pins into the fruit.

OPERATION

The operation of the device is best understood by referring to the schematic diagrams in FIGURES 17 and 18 and the schematic plan of the machine shown in FIGURE 1. An individual fruit is placed in a fruit supporting mechanism 39 on the feeder table 69 at the input station 20. The stem-blossom axis of the fruit is aligned generally vertically by positioning the end of the axis in the beam of a rough centering light 209. The details of the rough centering light may be found in the aforementioned Polk Patent 3,132,734 and in Cox Patent No. 2,901,087. At this time the gripping fingers 120 of the fruit holding assembly 40 are held open and the actuating rod of the pneumatic actuator 144 is retracted. The gripping fingers are held open not only by the friction between the fingers and the washers 128 but are also positively locked open by the latch 162. The fruit holding cup 84 at the input station is centered.

Next the feeder turret 18 is indexed to move the fruit into position at the aligning station 21. After the turret comes to rest, a timing cam 210a allows switch S1 (FIG. 18) to close energizing circuit A to close solenoid operated valves SV's 17, 18, 11 and 12. Energization of SV17 moves the valve from its normally open position to an exhaust position whereas energization of SV18 moves this valve from a normally closed exhaust position to an open position. This causes the cylinder of the pneumatic actuator 190 to be raised carrying with it the lower centering pin actuating assembly 188 and the centering assembly 187. The righthand vertical bar 185 is, accordingly, also raised with its cam surface 186 engaging the operating arm of the switch S3. Normally closed solenoid valve SV11 is opened to the air supply to admit air simultaneously to the lower ends of the actuators 181 and 182. SV12 which is normally opened is simultaneously closed to the exhaust position to exhaust the air on the upper side of the pneumatic actuator 181, the lower end of the actuator 183, and the top of a combined air and oil tank 211. With the air pressure removed from the top of the oil in the tank, the oil in the top of the actuator 182 is forced out through a restriction in a flow control valve, through the normally opened solenoid valve SV13 and into the air and oil tank. At this time the rectangular support frame 176 and the centering assembly 178 are moved downwardly at a speed controlled by the size of the restriction of the flow control valve. The probe tube 194 is also moved downwardly until it engages the top of the grapefruit in the fruit holding cup 184.

When the probe tube 194 engages the fruit, it is halted while the rectangular support frame 176 continues to move downwardly. This causes the actuating arm of the switch S2 to move relative to the cam 207. When the contacts of the switch S2 are closed by the cam 207 circuit C is energized. Normally opened solenoid valves SV's 13 and 14 are closed to exhaust position; however, since in valve SV13 the exhaust is blocked the oil is locked in the actuator 182. This effectively precludes further movement of the actuators 181 and 182 and holds the rectangular support frame and the centering assembly 178 in a fixed position dependent upon the height of the grapefruit. Thus, this locking arrangement allows the centering pins 180 to enter the top portion of the grapefruit a predetermined distance determined by the position of the cam 207 on the probe tube 194. For grapefruit this distance is preferably ⅝ to ¾ of an inch. SV14 is moved from a normally closed exhaust position to an open position in communication with the air supply. This causes the actuator 183 to move the actuating tube 196 downwardly to close the centering pins 180. The air in the lower end of the actuator 183 is exhausted through a flow control valve thus reducing the speed with which the centering pins are closed. SV14 simultaneously energizes the actuator 205 to lift the probe tube upwardly out of the path of the centering pins.

Simultaneously with the closing of the normally open solenoid valves SV's 13 and 14 the normally closed solenoid valves SV's 16 and 20 are opened. Normally closed SV16 is opened to energize the pneumatic actuator 144 and release the frictional holding of the fruit gripping fingers 120. Likewise, normally closed SV20 is moved from the exhaust to the open position to energize the pneumatic actuator 116 to push the lever rod 105 of the retainer clips 90 into the latched position so that the fruit carrying cup is released for free movement.

Solenoid valve SV25 is energized by a second cam operated switch S4. Switch S4 is operated by a cam 210b which is timed to close the switch and energize circuit D at approximately the same time as switch S1; however, since circuit D is energized only when switch S2 is closed, solenoid valve SV25 is operated only when a fruit is in the fruit carrying cup 84. When circuit D is energized solenoid valve SV25 is moved from a normally exhaust position to an open position to allow air to enter the actuator 170 and raise the lever arm 168 and thus unlatch the gripping fingers 120. Cam 210b then re-opens the switch S4, de-energizing solenoid valve SV25, allowing the spring to force the air out of the actuator 170 through the restriction in a flow control valve, and allow the gripping fingers to slowly close on the fruit.

Of course, prior to the fruit gripping fingers 120 engaging the fruit the righthand vertical bar 185 has risen to close the actuating arm of the switch S3 to energize circuit B. Valve SV19 which is normally in the exhaust position is opened to the air supply energizing the pneumatic actuator 191 to close the lower centering pins 189. Thus, when the fruit gripping fingers are finally moved into engagement with the fruit it has already been aligned by the upper and lower centering pins.

When the cam 210a reopens the switch S1 the circuits A–D are broken and the valves return to their normal positions. This causes the centering pins 180 and 189 to re-open, the centering assemblies 178 and 187 to be retracted and the probe tube 194 dropped down into its normal position between the upper centering pins. The fruit carrying cup 84 is still unrestrained and the fruit gripping fingers 120 are frictionally held in engagement with the fruit at the centering station and the inactive station. The fruit gripping fingers are held in frictional engagement after closing on the fruit due to the return of the solenoid valve SV16 to a normally closed exhaust position which causes the retraction of the actuating rod of the pneumatic actuator 144 to allow the washers 128 to again frictionally hold the gripping fingers. Consequently, as the fruit is moved from the centering station 21 to the inactive station 22 and on to the transfer station 23 it is held in its properly aligned position by the fruit gripping fingers.

A third cam operated switch S5 is controlled by a cam 210c which is timed to close the switch while the fruit is positioned at the transfer station 23. The cam is, of course, also timed with the transfer mechanism 16. When switch S5 is closed circuit E is completed, energizing solenoid valves SV's 9 and 15. When SV9 is energized it is opened admitting air to the pneumatic actuator 117 and the pneumatic actuator 171. These actuators are located at the transfer station 23. The pneumatic actuator 171 is energized to raise the rollers 158 and thus open the fruit gripping fingers 120. When the pneumatic actuator 117 is energized its actuating rod strikes the latch 113 to release the retaining clips 90 and thus recenter the fruit carrying cup 84. Prior to closing the switch S5, of course, the transfer mechanism has lowered and gripped the fruit in its aligned position so that the fruit is immediately raised when the fruit gripping fingers 120 are opened and the retaining clips 90 are moved into engagement with the fruit carrying cup 84. The latch 162 automatically, due to its weight, swings into a latched position to positively hold the fruit gripping fingers open. Simultaneously, with the raising of the rollers 158, SV15 is moved to the open position to energize the actuator 146 and release the friction washers 128 to allow free movement of the fruit gripping fingers while they are being opened.

A conventional interlock switch system (not shown) is provided to assure the upper and lower centering assemblies are completely retracted prior to indexing the feeder turret 18. The details of the interlock system are not necessary to the operation of the machine, however, and no details will be included.

As can be readily seen, the foregoing description covers an apparatus embodying several advantageous features. Among these are a unique combination of carrying, aligning, and holding units which produce a greatly improved fruit handling apparatus. Secondly, the holding apparatus greatly increases the ease and accuracy of moving the aligned fruit. Thirdly, the fruit supporting mechanism which provides for universal movement of the fruit while being aligned greatly improves the accuracy of the aligning procedure and reduces damage to the fruit. Another advantage is provided by the fruit height sensing apparatus which enables accurate penetration of the centering pins into the fruit.

It will be evident that modifications and variations may be effected without departing from the novel concepts of the invention. Accordingly, it is to be understood that the present invention is not to be limited except by the scope and proper interpretation of the appended claims.

We claim:

1. In a fruit handling apparatus, a mechanism for holding the fruit against movement comprising two gripping members, means for opening said gripping members, means for urging said gripping members into engagement with the fruit to be held, positive latching means for restraining movement of said gripping members in an open position spaced from said fruit, and separate means for clamping said gripping members to restrain their movement after they have been urged into engagement with said fruit.

2. The holding mechanism defined by claim 1 wherein said gripping members include two sets of fingers, each set including a plurality of pivotally mounted fingers each separately spring biased toward the fingers of the other set whereby the fingers are able to close on and conform to unevenly shaped fruit.

3. The holding mechanism defined by claim 2 wherein said restraining means includes friction means spaced between said fingers, and means for squeezing the fingers along their pivotal axes so that the fingers are engaged by said friction means and held against movement.

4. The holding mechanism defined by claim 2 wherein each of said fingers has a fruit engaging portion and a radial extension, and wherein at least one of each set of fingers is elongated and bent.

5. The holding mechanism defined by claim 1 further including means for resisting movement of said gripping members as they are urged into engagement with the fruit whereby the gripping members are closed slowly on the fruit.

6. In a fruit handling machine fruit supporting apparatus comprising a table, a base member, means supporting said base member on said table for free movement in any direction along said table, a fruit carrying member, and means supporting said fruit carrying member on said base member for free angular movement relative to said base member.

7. The apparatus defined by claim 6 wherein said base has a concave upper surface provided with a plurality of spaced recesses, said means supporting said fruit carrying member on said base member includes ball bearings positioned in said recesses, and said fruit carrying member has a lower convex surface which rides on said ball bearings to effect said angular movement.

8. The apparatus defined by claim 6 further including means for centering said base member and said fruit carrying member relative to a predetermined point on said table.

9. The apparatus defined by claim 8 wherein said centering means includes a plurality of retainer clips pivotally mounted on said table at equally spaced distances from said predetermined point, and means for simultaneously moving said clips inwardly toward said predetermined point so as to engage said fruit carrying member and position it over said predetermined point on said table.

10. The apparatus defined by claim 9 wherein said means for moving said retainer clips includes a circular ring gear and each of said retainer clips includes a pinion gear interengaging said ring gear whereby movement of one pinion gear rotates said ring gear to simultaneously rotate the remaining pinion gears.

11. The apparatus defined by claim 9 wherein each of said retainer clips includes an inclined and a vertical cam surface.

12. A fruit handling machine comprising a rotatable turret having a plurality of stations equi-angularly spaced thereabout, a flat plate horizontally mounted upon said turret for rotation therewith, a fruit aligning device located at one of said stations, a plurality of fruit supporting devices mounted upon said plate for free lateral movement thereover and for angular movement with respect to a vertical axis to permit the fruit supported thereby to be aligned by said aligning device, means for intermittently indexing said turret to move said fruit supporting devices between said stations, and a fruit holding mechanism associated with each of said fruit supporting devices for engaging a fruit in a supporting device after it has been aligned and for restraining it in its properly aligned position when said supporting device is indexed to a subsequent station.

13. A fruit handling machine according to claim 12 including restraining means associated with each of said fruit supporting devices for locking the supporting device in a fixed position upon said plate, and means for operating said restraining means at the aligning station after the fruit supported at said station has been aligned.

14. The machine defined by claim 12 wherein each of said fruit holding mechanisms includes two sets of spaced fingers arranged to move inwardly to engage the fruit, and a positive latch mechanism for precluding inward movement of said gripping fingers in the absence of a fruit in said associated fruit supporting device.

15. The machine defined by claim 12 wherein each of said supporting devices includes a base member and a fruit carrying member mounted on said base member for angular movement relative thereto.

16. The machine defined by claim 12 wherein said aligning device includes two clusters of elongated centering pins and means for closing said clusters on the core material of the fruit.

17. In a fruit aligning device having first centering means for penetrating the fruit at one end thereof and moving the end into a predetermined position and second centering means for penetrating the fruit at the opposite end thereof and moving this end into a predetermined position, the improvement comprising sensing means for contacting the outer surface of the fruit, and means for limiting the depth of penetration of said first centering means into the fruit in response to actuation by said sensing means.

18. The device defined by claim 17 wherein said first centering means is mounted for movement toward the fruit and said sensing means includes a probe tube slidably mounted on said first centering means for movement relative to said first centering means when said probe tube engages a fruit, a cam fastened to said probe tube, and means responsive to movement of said cam for halting the movement of said first centering means toward said fruit.

References Cited
UNITED STATES PATENTS 2,742,137   4/1956   Carroll.
2,788,818   4/1957   Skog.
2,859,856   11/1958   Fox.

EDWARD A. SROKA, *Primary Examiner.*

U.S. Cl. X.R.

198—209